(12) United States Patent
Bengtsson et al.

(10) Patent No.: US 9,758,085 B2
(45) Date of Patent: Sep. 12, 2017

(54) VEHICLE SAFETY ILLUMINATION ARRANGEMENT AND METHOD

(71) Applicant: VOLVO CAR CORPORATION, Goeteborg (SE)

(72) Inventors: Mattias Bengtsson, Billdal (SE); Yury Tarakanov, Moelndal (SE); Feng Liu, Moelndal (SE); Adeel Zafar, Hisings Backa (SE)

(73) Assignee: Volvo Car Corporation, Gothenburg (SE)

( * ) Notice: Subject to any disclaimer, the term of this patent is extended or adjusted under 35 U.S.C. 154(b) by 184 days.

(21) Appl. No.: 13/862,627

(22) Filed: Apr. 15, 2013

(65) Prior Publication Data

US 2013/0274999 A1 Oct. 17, 2013

(30) Foreign Application Priority Data

Apr. 16, 2012 (EP) ..................................... 12164232

(51) Int. Cl.
*B60Q 1/08* (2006.01)
*B60Q 1/14* (2006.01)
*B60Q 1/52* (2006.01)

(52) U.S. Cl.
CPC .............. *B60Q 1/085* (2013.01); *B60Q 1/143* (2013.01); *B60Q 1/525* (2013.01);
(Continued)

(58) Field of Classification Search
CPC ........ B60Q 1/085; B60Q 1/143; B60Q 1/525; B60Q 2300/336; B60Q 2300/45; B60W 2550/10
(Continued)

(56) References Cited

U.S. PATENT DOCUMENTS 6,403,942 B1 * 6/2002 Stam ...................... B60Q 1/085
250/208.1
7,034,668 B2 * 4/2006 Engelman et al. ........... 340/435
(Continued)

FOREIGN PATENT DOCUMENTS

CN 201573591 U 9/2010
DE 19835237 2/2000
(Continued)

OTHER PUBLICATIONS

Extended European Search Repor for EP 12164232.6, Completed by the European Patent Office on Jul. 25, 2012, 6 Pages.
Chinese Patent Office, Search Report for corresponding Application No. CN2013101294239, dated Feb. 18, 2016.
Chinese Patent Office, Second Office Action for corresponding Application No. CN2013101294239, dated Dec. 2, 2016.

*Primary Examiner* — Jerrah Edwards
*Assistant Examiner* — Donald J Wallace
(74) *Attorney, Agent, or Firm* — Brooks Kushman P.C.

(57) ABSTRACT

A vehicle safety illumination method and arrangement is provided including a head light control unit for modulating an intensity of a head light of a vehicle between a low beam mode and a high beam mode. The arrangement may include a switch for actuating the head light control unit, and sensors to detect an object in front of the vehicle. The arrangement also includes a processor to determine if an object detected constitutes a potential collision threat to the vehicle. The arrangement is arranged to actuate the head light control unit if an object in front of the vehicle is determined to constitute a potential collision threat to the vehicle.

15 Claims, 1 Drawing Sheet

(52) U.S. Cl.
CPC .... *B60Q 2300/336* (2013.01); *B60Q 2300/45* (2013.01); *B60W 2550/10* (2013.01)

(58) Field of Classification Search
USPC ..................................................... 701/36, 45
See application file for complete search history.

(56) References Cited

U.S. PATENT DOCUMENTS

| | | | | |
|---|---|---|---|---|
| 7,095,336 | B2* | 8/2006 | Rodgers et al. | 340/903 |
| 7,156,542 | B2* | 1/2007 | Miller et al. | 362/466 |
| 8,164,432 | B2* | 4/2012 | Broggi et al. | 340/435 |
| 8,599,001 | B2* | 12/2013 | Schofield | B60N 2/002 340/425.5 |
| 8,768,007 | B2* | 7/2014 | Schamp | 382/103 |
| 2008/0239076 | A1* | 10/2008 | Luo | 348/148 |
| 2009/0072124 | A1* | 3/2009 | Schofield et al. | 250/208.1 |
| 2010/0213847 | A1 | 8/2010 | Biondo et al. | |
| 2011/0288774 | A1* | 11/2011 | Bengtsson et al. | 701/301 |

FOREIGN PATENT DOCUMENTS

| | | |
|---|---|---|
| DE | 10357238 | 3/2005 |
| DE | 102006054754 | 9/2007 |
| DE | 102008057375 | 5/2010 |
| EP | 1407929 | 4/2004 |
| EP | 2116421 A2 | 11/2009 |
| FR | 2921601 | 4/2009 |

\* cited by examiner

VEHICLE SAFETY ILLUMINATION ARRANGEMENT AND METHOD

CROSS-REFERENCE TO RELATED APPLICATIONS

This application claims priority to European Patent Application No. 12164232.6 filed 16 Apr. 2012, the disclosure of which is incorporated in its entirety by reference herein.

TECHNICAL FIELD

The present disclosure relates to a vehicle safety illumination arrangement and a vehicle safety illumination method for modulating an intensity of at least one head light of a vehicle. The present disclosure further relates to a vehicle, hosting such an arrangement.

BACKGROUND

Illumination of head lights of vehicles, such as automobiles, trucks and motorcycles, is a vital safety aspect, especially when driving in dark conditions. The main purpose of the illumination is to illuminate an area in front of the vehicle. Another advantage of the illumination is that it facilitates detection of the vehicle. When driving in dark conditions, head lights having a high beam mode are a solution to increase the illumination and widen the area being illuminated by the head lights. The vehicle driving safety in dark conditions is significantly increased when driving with the head lights in high beam mode, due to an increased visibility of the area in front of the vehicle. However, due to risk of dazzling oncoming traffic it must be turned off in many driving situations. When turned off under dark conditions, the risk of collision is significantly increased. Some of today's vehicles are provided with an automatic head light control unit that turns on a high beam mode when judged not to risk a dazzling of oncoming traffic and turn off the head beam mode when judged a risk of dazzling. Such a unit is associated with the drawback of it not being assured that drivers use the unit at all time. Therefore, there is a need for a solution which can increase the safety of driving, especially under dark conditions.

SUMMARY

An object of the present disclosure is to increase the safety of driving under dark conditions.

According to an aspect of the disclosure, the object is achieved by a vehicle safety illumination arrangement, comprising a head light control unit for modulating an intensity of at least one head light of a hosting vehicle between at least a low beam mode and a high beam mode. The arrangement comprises means for actuating the head light control unit, and means to detect an object in front of the vehicle, hosting the arrangement. The arrangement comprises processing means arranged to determine if an object detected constitutes a potential collision threat to the vehicle, hosting the arrangement, and the arrangement is arranged to actuate the head light control unit if an object in front of the vehicle is determined to constitute a potential collision threat to the vehicle, hosting the arrangement.

Since the arrangement is arranged to activate the head light control unit if an object in front of the vehicle is determined to constitute a potential collision threat to the vehicle, hosting the arrangement, an intensity of at least one head light is being modulated between at least a low beam mode and a high beam mode. The actuation of the head light control unit may facilitate detection of the object, and may alert the driver, and/or a pedestrian, and/or another driver about an upcoming critical situation. Thereby, the safety of driving is increased, especially when driving under dark conditions.

As a result, the above mentioned object is achieved.

In case of bright conditions, an actuation of the high beam mode or the low beam mode may still increase the safety of driving since the actuation may alert a pedestrian or another driver about an upcoming critical situation.

According to some embodiments, the vehicle safety illumination arrangement comprises a switch, or the like, by which a driver may activate or deactivate the head light control unit. In such embodiments, the arrangement may be arranged to activate the head light control unit, if the head light control unit has been deactivated by the driver, and if an object in front of the vehicle is determined to constitute a potential collision threat to the vehicle, hosting the arrangement. The arrangement may utilize the switch in order to activate the head light control unit or a second switch unit being able to activate the head light control unit.

According to some embodiments, the head light control unit in the activated state, is arranged to activate the high beam mode if an object in front of the vehicle is determined to constitute a potential collision threat to the vehicle. Also, the head light control unit may be arranged to activate the high beam mode when being activated, by the means to activate the head light control unit, i.e. when an object detected is determined to constitute a potential collision threat to the vehicle. According to alternative embodiments, any other part of the arrangement is adapted to actuate the high beam mode in case an object detected is determined to constitute a potential collision threat to the vehicle.

Since the high beam mode is activated if an object in front of the vehicle is determined to constitute a potential collision threat to the vehicle, the object may be illuminated and the detection of the object may be facilitated. Thereby, the safety of driving is increased, especially under dark conditions.

According to some embodiments, the head light control unit may be able to modulate an intensity of the at least one head light to an illumination mode wherein both high beam and low beam is activated, whereby an area in front of the vehicle may be illuminated with an intensity exceeding an intensity achieved by the head lights in the high beam mode. Thereby, the safety of driving may be increased, especially under dark conditions.

According to some embodiments, the head light control unit is an automatic head light control unit arranged to, in the activated state, switch between the low beam mode and the high beam mode on the basis of at least one input from at least one sensor. Thus, in such embodiments, the vehicle safety illumination arrangement is arranged to activate the automatic head light control unit if an object in front of the vehicle is determined to constitute a potential collision threat to the vehicle, hosting the arrangement.

According to some embodiments, the at least one input is indicative of a traffic situation in front of the vehicle. The traffic situation may encompass oncoming traffic such as oncoming vehicles, traffic lights etc. The at least one sensor may comprise a vision based system, such as a camera system, and/or an infra-red vision based system, such as an infra-red camera system, and/or an imaging device, which may be arranged as a single imaging device or a stereo system comprising two or more single imaging devices or a time-of-flight imaging device, which imaging device may be a infra-red imaging device, and/or a LIDAR (Light Detecting And Ranging) system, and/or a Radar (Radio Detection And Ranging) system.

According to some embodiments, the automatic head light control unit is adapted to activate the high beam mode in case the traffic situation indicates a low risk of dazzling oncoming traffic and to activate the low beam mode in case of the traffic situation indicates a high risk of dazzling oncoming traffic. The activation of the high beam mode and the low beam mode may be based on algorithms that may be embedded in the head light control unit.

In case an object in front of the vehicle is determined to constitute a potential collision threat to the vehicle, hosting the arrangement, the vehicle safety illumination arrangement may activate the automatic head light control unit, wherein the automatic head light control unit may be arranged to activate the high beam mode in case the traffic situation indicates a low risk of dazzling oncoming traffic and to activate the low beam mode in case of the traffic situation indicates a high risk of dazzling oncoming traffic. Thus, according to such embodiments, the high beam mode is activated in case an object is determined to constitute a potential collision threat and if the traffic situation indicates a low risk of dazzling oncoming traffic. Accordingly, in case an object determined to constitute a potential collision threat is an animal, a pedestrian, or any other object not being an oncoming vehicle, and if the traffic situation indicates a low risk of dazzling oncoming traffic, the head light control unit may activate the high beam mode to thereby facilitate the detection of the object. Thereby, the safety of driving is increased.

In case an object determined to constitute a potential collision threat is an oncoming vehicle driving with head lights in a low beam mode or high beam mode, it is likely that the driver is able to see the oncoming vehicle without the high beam mode being activated. Also, in some jurisdictions, there may be regulatory requirements regarding an actuation of a high beam mode, by an automatic head light control unit, in case a traffic situation indicates a high risk of dazzling oncoming traffic.

According to some embodiments, the actuation of the high beam mode involves a switching from the low beam mode to the high beam mode. Thus, in such embodiments, the means for actuating the low beam mode and high beam mode may switch the at least one head light from the low beam mode to the high beam mode.

According to some embodiments, the head light control unit comprises means for indicating an ambient light level. The means for indicating an ambient light level may comprise one or more light sensors arranged to sense an ambient light condition, and/or a global positioning unit forming part of a navigation unit, or any other means for indicating an ambient light condition. The head light control unit may utilize the means for indicating an ambient light level to modulate the intensity of the at least one head light between at least the low beam mode and the high beam mode.

According to some embodiments, the head light control unit may be adapted to activate the high beam mode only if the means for indicating an ambient light level indicates that the ambient light level is lower than a predetermined threshold light level. That is, the head light control unit may be adapted to only activate the high beam mode if an ambient light condition is darker than a predetermined threshold light condition.

In embodiments wherein the arrangement comprises at least one ambient light sensor arranged to sense an ambient light condition, the processing means may be adapted to receive an input signal indicative of the ambient light condition from the ambient light sensor, wherein the head light control unit is arranged to activate the high beam mode only if the input signal indicative of the ambient light condition is lower than a predetermined threshold value.

According to some embodiments, the means to detect an object in front of the vehicle comprises a vision based system. Such vision based system may comprise a camera system and/or an imaging device, which may be arranged as a single imaging device, or a stereo system comprising two or more single imaging devices or a time-of-flight imaging device, capable of detecting an object in front of the vehicle. The vision based system may provide a digital representation of the environment in front of the vehicle to the processing means. The processing means may be adapted to process the digital representation of the environment in front of the vehicle to thereby detect an object in front of the vehicle. The processing means may then determine if an object detected, constitutes a potential collision threat to the vehicle, hosting the arrangement. Thus, according to some embodiments, the means to detect an object comprises processing means. Such processing means may be the processing means arranged to determine if an object constitutes a collision threat to the vehicle, or separate processing means, specifically adapted to detect an object.

According to some embodiments, the vision based system is an infra-red vision based system. Such infra-red vision based system may comprise an infra-red camera system and/or an imaging device which may be arranged as a single imaging device, or a stereo system comprising two or more single imaging devices or a time-of-flight imaging device, capable of detecting an object in front of the vehicle even in dark conditions.

According to some embodiments, the means to detect an object in front of the vehicle comprises a light detecting and ranging system. Such system may be called a LIDAR-system or laser scanning system. The light detecting and ranging system may utilise ultraviolet, visible, or near infra-red laser to detect an object. Thus, according to such embodiments, an object in front of the vehicle may be detected even in case of dark conditions.

According to some embodiments, the means to detect an object in front of the vehicle comprises a radar system. Since a radar system is working with radio waves, according to such embodiments, an object in front of the vehicle may be detected even in case of dark conditions.

As indicated above, the means to detect an object may comprise ambient illumination-independent arrangements.

According to some embodiments, the means to detect an object in front of the vehicle and/or the processing means may be comprised in a threat assessment arrangement being adapted to support additional safety enhancing measures and/or collision preventive measures. Such additional safety enhancing measures and/or collision preventive measures may for example be to brake the vehicle, preparing airbags or other safety arrangements, tighten seatbelts, alerting the driver with e.g. audible signals and/or haptic signals, and/or visible signals such as a flashing symbol displayed to the driver. Accordingly, according to some embodiments, the vehicle safety illumination arrangement may utilize a threat assessment arrangement in the detecting of an object in front of the vehicle and in the determining of whether an object detected constitutes a potential collision threat. Also, as indicated above, the head light control unit may be an automatic head light control unit.

Consequently, in vehicles comprising threat assessment arrangements and/or automatic head light control units, the vehicle safety illumination arrangement according to the present disclosure may be easy to implement, and/or may be implemented at low cost, since the arrangement may not need additional components and may only need minimal modifications in software as these functions already may be comprised in the threat assessment arrangements and/or the automatic head light control units.

According to an aspect of the disclosure, the object is achieved by a vehicle safety illumination method for modulating an intensity of at least one head light of a vehicle, using a head light control unit, for modulating an intensity of at least one head light of a hosting vehicle between at least a low beam mode and a high beam mode, and using means for actuating said head light control unit, and means to detect an object in front of said vehicle, hosting said arrangement.

The method comprises;

determining if an object detected constitutes a potential collision threat to the vehicle, hosting the arrangement, using processing means, and actuating the head light control unit if an object in front of the vehicle is determined to constitute a potential collision threat to the vehicle, hosting the arrangement.

Again, since the head light control unit is activated if an object in front of the vehicle is determined to constitute a potential collision threat to the vehicle, hosting the arrangement, an intensity of at least one head light is being modulated between at least a low beam mode and a high beam mode. Thereby, the safety of driving is increased, especially under dark conditions.

As a result, the above mentioned object is achieved.

Further features of, and advantages with, the present disclosure will become apparent when studying the appended claims and the following detailed description. Those skilled in the art will realize that different features of the present disclosure may be combined to create embodiments other than those described in the following, without departing from the scope of the present disclosure, as defined by the appended claims.

BRIEF DESCRIPTION OF THE DRAWINGS

The various aspects of the disclosure, including its particular features and advantages, will be readily understood from the following detailed description and the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure will now be described more fully with reference to the accompanying drawings, in which example embodiments are shown. However, this disclosure should not be construed as limited to the embodiments set forth herein. Disclosed features of example embodiments may be combined as readily understood by one of ordinary skill in the art to which this disclosure belongs. Like numbers refer to like elements throughout.

Well-known functions or constructions will not necessarily be described in detail for brevity and/or clarity.

Figure 1:
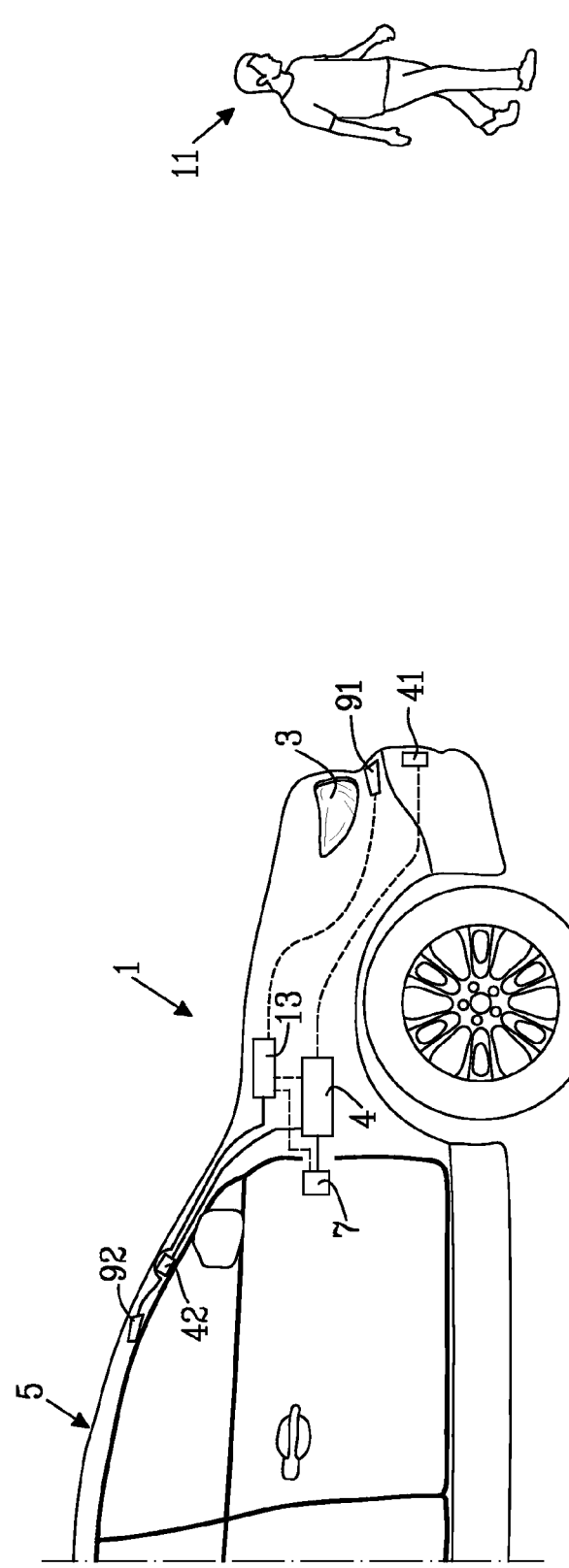
FIG. 1 illustrates a vehicle 5 comprising a vehicle safety illumination arrangement 1 according to some embodiments.

FIG. 1 illustrates a vehicle 5 comprising a vehicle safety illumination arrangement 1 according to some embodiments. The vehicle 5 comprises at least one head light 3 being capable of operating in at least a low beam mode and in a high beam mode. The arrangement 1 comprises a head light control unit 4 for modulating an intensity of the at least one head light 3 of the vehicle 5 between at least the high beam mode and the low beam mode. The arrangement 1 comprises means 7 for actuating the head light control unit 4 and means 91, 92 to detect an object 11 in front of the vehicle 5, hosting the arrangement 1. The arrangement 1 comprises processing means 13 arranged to determine if an object detected constitutes a potential collision threat to the vehicle 5, hosting the arrangement 1. The arrangement 1 is arranged to activate the head light control unit 4 if an object 11 in front of the vehicle 5 is determined to constitute a potential collision threat to the vehicle 5, hosting the arrangement 1.

Accordingly, the processing means 13 may be provided with input signals retrieved from the means 91, 92 to detect an object in front of the vehicle 5, and via a processing of the input signals determine if the object 11 detected constitutes a potential collision threat to the vehicle 5, hosting the arrangement 1.

The means 7 for actuating the head light control unit 4 may comprise a switch, a relay or any other component or arrangement capable of actuating the head light control unit 4.

Further, the head light control unit 4 may comprise a switch, a relay or any other component or arrangement capable of actuating and/or deactivating the high beam mode and the low beam mode.

The means 91, 92 to detect an object 11 in front of the vehicle 5 hosting the arrangement 1 may comprise a vision based system, such as a camera system which may include a stereo video arrangement or time-of-flight arrangement, and/or an infra-red vision based system, such as an infra-red camera system, and/or a LIDAR (Light Detecting And Ranging) system which may include a stereo video arrangement or time-of-flight arrangement, and/or a Radar (Radio Detection And Ranging) system. Such means 91, 92 to detect an object in front of the vehicle 5 may be positioned in the front of the vehicle 5, as illustrated with the reference sign 91 in FIG. 1, and/or in a region of a windscreen of the vehicle, e.g. in a region of the rear view mirror, as indicated with the reference sign 92.

The means 91, 92 to detect an object 11 may provide a digital representation of the environment in front of the vehicle 5 to the processing means 13. The processing means 13 may be adapted to process the digital representation of the environment in front of the vehicle to thereby detect an object 11 in front of the vehicle 5. The processing means 13 may then determine if an object 11 detected constitutes a potential collision threat to the vehicle 5, hosting the arrangement 1. Thus, according to some embodiments, the means to detect an object 11 comprises processing means. Such processing means may be the processing means 13 arranged to determine if an object constitutes a collision threat to the vehicle 5, or separate processing means, specifically adapted to detect an object.

The processing means 13 may comprise one or more processing units, e.g. processors and may comprise one or more memories coupled thereto. The processing means 13 may utilize threat assessment algorithms in the determining. The determining may be based on several parameters such as the position of, velocity of, and type of the object detected, host-vehicle velocity, actual road conditions, velocity of the object detected, slope of the road, etc. Thus, the processing means 13 may be provided with signals from several arrangements and/or systems, such as velocity sensor, a traction control system, an ABS-system, a temperature sensor, a global positioning system comprised in a navigation system, etc. Accordingly, the determining may be based on parameters retrieved from such arrangements and/or systems.

The head light control arrangement 4 may be arranged to, in the activated state, activate the high beam mode, if an object in front of the vehicle 5 is determined, by the processing means 13, to constitute a potential collision threat to the vehicle 5.

The head light control unit 4 may be an automatic head light control unit arranged to, in the activated state, switch between the low beam mode and the high beam mode on the basis of an input from at least one sensor 41, 42.

Such at least one sensor 41, 42 may comprise a vision based system, such as a camera system which may include a stereo video arrangement or time-of-flight arrangement, and/or an infra-red vision based system, such as an infra-red camera system, and/or a LIDAR (Light Detecting And Ranging) system which may include a stereo video arrangement or time-of-flight arrangement, and/or a Radar (Radio Detection And Ranging) system. The at least one sensor 41, 42 may be positioned in the front of the vehicle 5, as illustrated with the reference sign 41 in FIG. 1, and/or in a region of a windscreen of the vehicle, e.g. in a region of the rear view mirror, as indicated with the reference sign 42.

The input from the at least one sensor 41, 42 may be indicative of a traffic situation in front of the vehicle 5. The automatic head light control unit 4 may be adapted to actuate the high beam mode in case the traffic situation indicates a low risk of dazzling oncoming traffic and to actuate the low beam mode in case of the traffic situation indicates a high risk of dazzling oncoming traffic. In embodiments wherein the at least one sensor 41, 42 comprises a vision based system, such as a camera system, the automatic head light control unit 4 may be adapted to actuate or deactivate the low and high beam mode on the basis of illumination conditions, e.g. illumination by oncoming traffic.

Thus, according to some embodiments, the safety illumination arrangement may activate and/or deactivate the high or the low beam mode on the basis of illumination conditions or a potential collision threat detected.

Further, the head light control unit 4 may comprise processing means, wherein the processing means may be arranged to process the input from the at least one sensor 41, 42 to thereby determine whether to activate the low beam mode or the high beam mode.

The object 11 may be one or more moving objects such as other vehicles, pedestrians, animals, etc., or one or more stationary objects such as intersections, road signs, trenches, vehicles, pedestrians, animals, etc. The processing means 13 may detect the position of, velocity of, and type of the object detected. Consequently, an object determined to constitute a collision threat may involve an object constituting a direct collision threat, such as another vehicle, or an indirect collision threat, such as an intersection. Thus, the vehicle safety illumination arrangement 1 may be arranged to activate the head light control unit 4 even in case of an object, such as an intersection, not constituting a direct collision threat.

Figure 2:
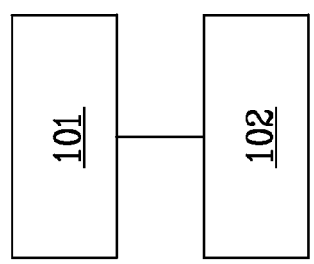
FIG. 2 illustrates a method for modulating an intensity of at least one head light of a vehicle, using a vehicle safety illumination arrangement.

FIG. 2 illustrates a vehicle safety illumination method for modulating an intensity of at least one head light 3 of a vehicle, using a head light control unit 4, for modulating an intensity of at least one head light 3 of a hosting vehicle 5 between at least a low beam mode and a high beam mode, and using means 7 for actuating said head light control unit 4, and means 91, 92 to detect an object 11 in front of said vehicle 5, hosting said arrangement 1.

The method comprising;

determining 101 if an object detected constitutes a potential collision threat to the vehicle 5, hosting the arrangement 1, using processing means 13, and actuating 102 the head light control unit 4 if an object 11 in front of the vehicle 5 is determined to constitute a potential collision threat to the vehicle 5, hosting the arrangement 1.

Since the head light control unit is actuated if an object in front of the vehicle is determined to constitute a potential collision threat to the vehicle, hosting the arrangement, an intensity of at least one head light is being modulated between at least a low beam mode and a high beam mode. Thereby, the safety of driving is increased, especially under dark conditions.

According to some embodiments, the actuating of head light control unit involves an actuation of the high beam mode.

According to some embodiments, the vehicle safety illumination method further comprises;

actuating the high beam mode if a traffic situation indicates a low risk of dazzling oncoming traffic, and actuating the low beam mode if a traffic situation indicates a high risk of dazzling oncoming traffic.

It is to be understood that the foregoing is illustrative of various example embodiments and the disclosure is not to be limited to the specific embodiments disclosed and that modifications to the disclosed embodiments, combinations of features of disclosed embodiments as well as other embodiments are intended to be included within the scope of the appended claims.

As used herein, the term "comprising" or "comprises" is open-ended, and includes one or more stated features, elements, steps, components or functions but does not preclude the presence or addition of one or more other features, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A vehicle safety illumination arrangement, comprising:
a head light control unit for modulating an intensity of at least one head light of a hosting vehicle between at least a low beam mode and a high beam mode;
means for actuating said head light control unit;
means to detect an object in front of said vehicle hosting said arrangement; and
processing means arranged to determine if an object detected constitutes a potential collision threat to said vehicle hosting said arrangement;
wherein the arrangement is arranged to actuate said head light control unit if an object in front of said vehicle is determined to constitute a potential collision threat to said vehicle hosting said arrangement;
wherein the head light control unit is an automatic head light control unit arranged to, in the actuated state based on a potential collision threat, switch between said low beam mode and said high beam mode on the basis of at least one input from at least one sensor, the at least one sensor comprising a light sensor arranged to sense an ambient light condition.

2. The arrangement according to claim 1 wherein said head light control unit in the actuated state, is arranged to activate said high beam mode if an object in front of said vehicle is determined to constitute a potential collision threat to said vehicle.

3. The arrangement according to claim 2 wherein the actuation of said high beam mode involves a switching from said low beam mode to said high beam mode.

4. The arrangement according to claim 1 wherein the at least one input is indicative of a traffic situation in front of the vehicle.

5. The arrangement according to claim 4 wherein the automatic head light control unit is adapted to actuate said high beam mode in case said traffic situation indicates a low risk of dazzling oncoming traffic and to actuate said low beam mode in case of said traffic situation indicates a high risk of dazzling oncoming traffic.

6. The arrangement according to claim 1 wherein the means to detect an object in front of said vehicle comprises a vision based system.

7. The arrangement according to claim 6 wherein the vision based system is an infra-red vision based system.

8. The arrangement according to claim 1 wherein the means to detect an object in front of said vehicle comprises a light detecting and ranging system.

9. The arrangement according to claim 1 wherein the means to detect an object in front of said vehicle comprises a radar system.

10. The arrangement according to claim 1 wherein said means to detect an object in front of said vehicle and said processing means is comprised in a threat assessment arrangement being adapted to support additional safety enhancing measures and/or collision preventive measures.

11. The arrangement according to claim 1 wherein the head light control unit is arranged to modulate an intensity of the at least one headlight to an illumination mode wherein both high beam and low beam are activated so that an area in front of the vehicle is illuminated with an intensity greater than an intensity achieved by the at least one headlight in high beam mode.

12. A vehicle having a vehicle safety illumination arrangement, the arrangement comprising:
a head light control unit for modulating an intensity of at least one head light of a hosting vehicle between at least a low beam mode and a high beam mode;
means for actuating said head light control unit;
means to detect an object in front of said vehicle hosting said arrangement; and
processing means arranged to determine if an object detected constitutes a potential collision threat to said vehicle hosting said arrangement;
wherein the arrangement is arranged to actuate said head light control unit if an object in front of said vehicle is determined to constitute a potential collision threat to said vehicle hosting said arrangement;
wherein the head light control unit is an automatic head light control unit arranged to, in the actuated state based on a potential collision threat, switch between said low beam mode and said high beam mode on the basis of at least one input from at least one sensor, the at least one sensor comprising a light sensor arranged to sense an ambient light condition.

13. The arrangement according to claim 12 wherein the head light control unit is arranged to modulate an intensity of the at least one headlight to an illumination mode wherein both high beam and low beam are activated so that an area in front of the vehicle is illuminated with an intensity greater than an intensity achieved by the at least one headlight in high beam mode.

14. A vehicle safety illumination method for modulating an intensity of at least one head light of a vehicle, using a head light control unit, for modulating an intensity of at least one head light of a hosting vehicle between at least a low beam mode and a high beam mode, and using means for actuating said head light control unit, and means to detect an object in front of said vehicle hosting said arrangement, the method comprising:
determining if an object detected constitutes a potential collision threat to said vehicle hosting said arrangement, using processing means; and
actuating said head light control unit if an object in front of said vehicle is determined to constitute a potential collision threat to said vehicle hosting said arrangement;
wherein the head light control unit is an automatic head light control unit arranged to, in the actuated state based on a potential collision threat, switch between said low beam mode and said high beam mode on the basis of at least one input from at least one sensor, the at least one sensor comprising a light sensor arranged to sense an ambient light condition.

15. The method according to claim 14 wherein the head light control unit is arranged to modulate an intensity of the at least one headlight to an illumination mode wherein both high beam and low beam are activated so that an area in front of the vehicle is illuminated with an intensity greater than an intensity achieved by the at least one headlight in high beam mode.

* * * * *